(12) United States Patent
King

(10) Patent No.: US 7,874,340 B2
(45) Date of Patent: Jan. 25, 2011

(54) LAMINATING MACHINE

(75) Inventor: Michael T. King, 3951 Joliet Ave., Lyons, IL (US) 60534

(73) Assignee: Michael T. King, Lyons, IL (US)

(*) Notice: Subject to any disclaimer, the term of this patent is extended or adjusted under 35 U.S.C. 154(b) by 1094 days.

(21) Appl. No.: 11/507,199

(22) Filed: Aug. 21, 2006

(65) Prior Publication Data

US 2008/0041529 A1 Feb. 21, 2008

(51) Int. Cl.
*B32B 37/00* (2006.01)
(52) U.S. Cl. .................................. 156/555; 156/582
(58) Field of Classification Search .............. 156/555, 156/580, 582, 583.1; 492/15, 42, 47
See application file for complete search history.

(56) References Cited

U.S. PATENT DOCUMENTS 4,149,682 A * 4/1979 Gustafson et al. ........ 242/571.3
5,580,417 A * 12/1996 Bradshaw .................. 156/495
6,827,015 B2 * 12/2004 Villarreal ................. 101/350.3

\* cited by examiner

*Primary Examiner*—James Sells
(74) *Attorney, Agent, or Firm*—Gregory B. Beggs

(57) ABSTRACT

A laminating machine with upper and lower laminating rollers and upper and lower laminating film supply rollers is disclosed. An upper laminating film extends onto the upper and lower laminating rollers and a lower laminating film also extends onto the laminating rollers. First and second frame members support the laminating rollers and the film supply rollers. A removable tray extending between the first and second frame members adjacent the nip between the laminating rollers carries a film insertion member which is moveable far enough to press the films into the nip. A spring-loaded chuck mounted on one of the frame members and supporting the end of a laminating film supply roller is also disclosed, as is an idler bar mounted in a bracket depending from the tray and engaging the film from the lower laminating film supply roller when the tray is in place. There is also a film deflector which overlies the upper laminating film as it exits from the laminating rollers located intermediate the upper laminating roller and an upper draw roller which is downstream.

6 Claims, 7 Drawing Sheets

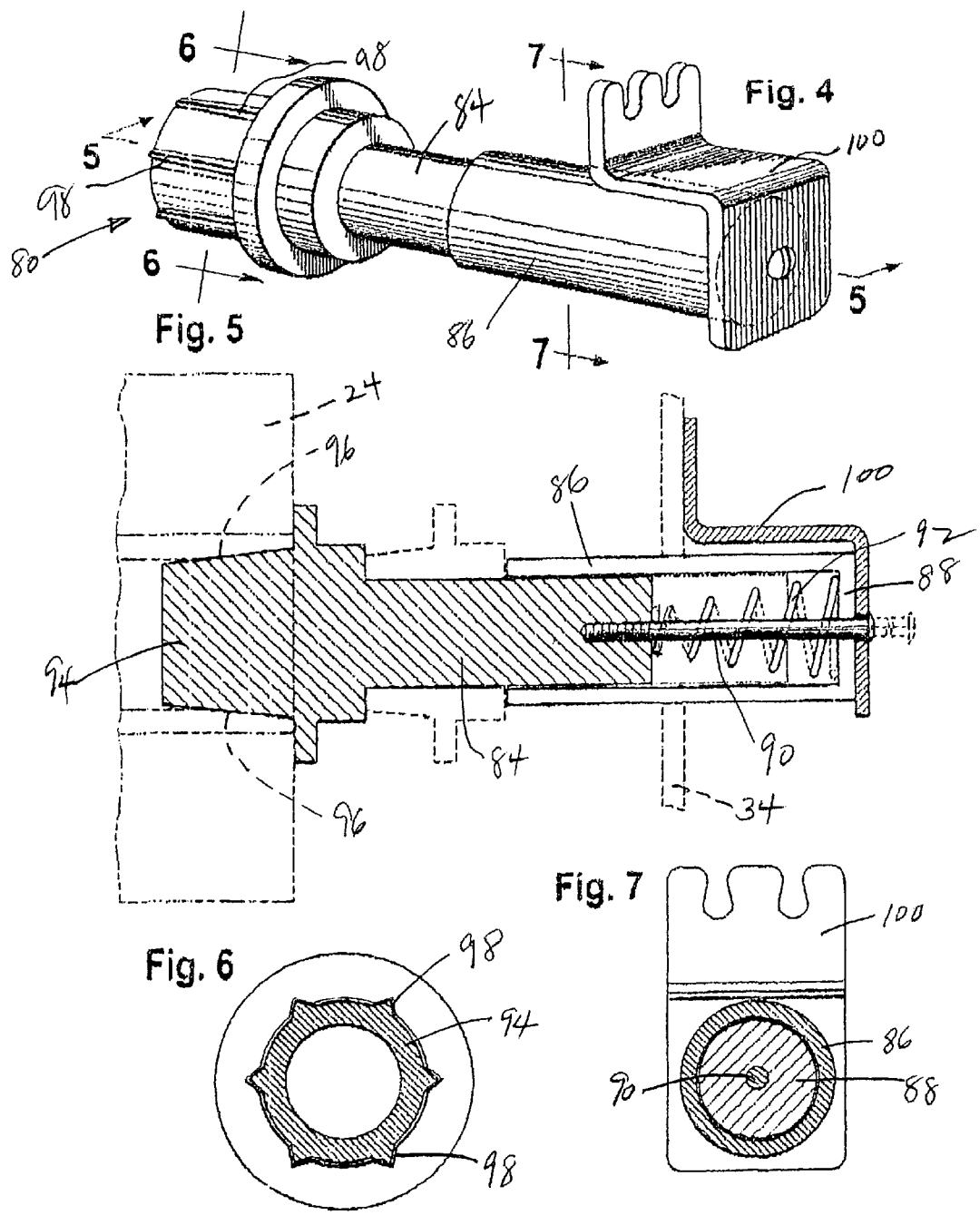

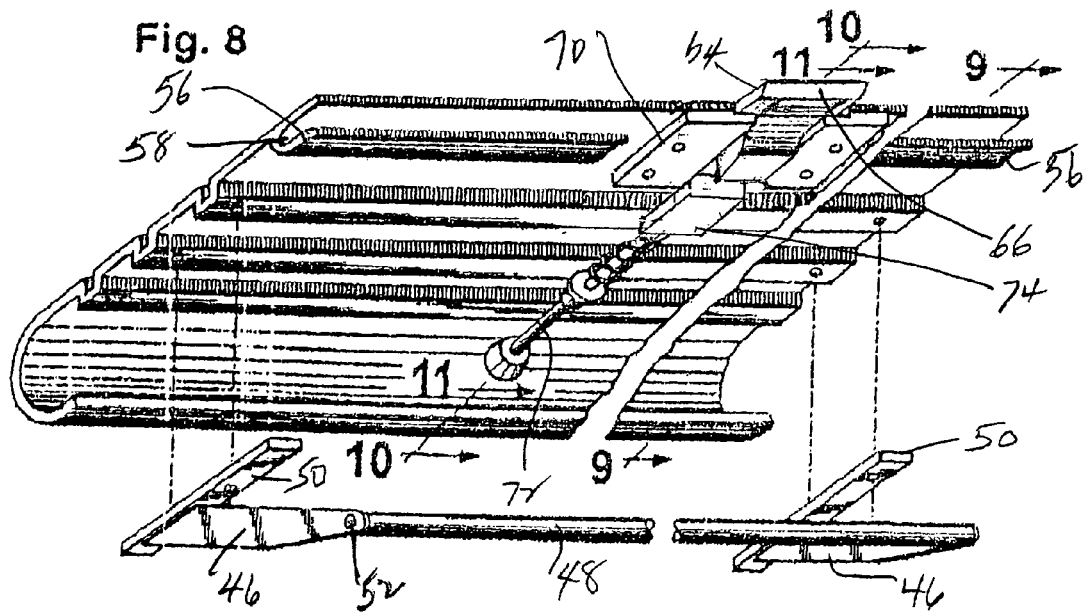
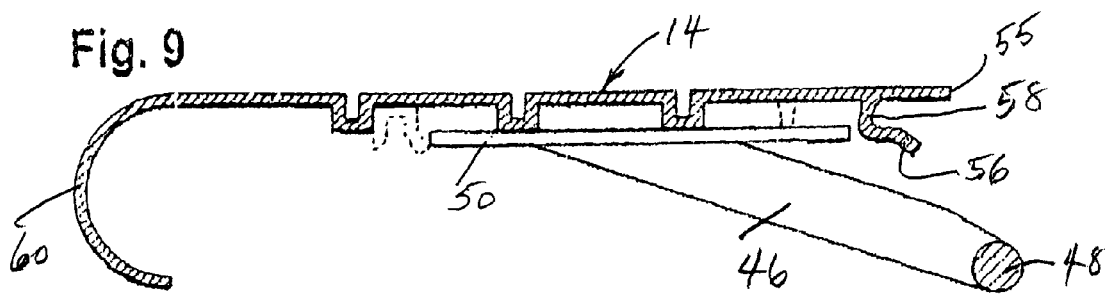
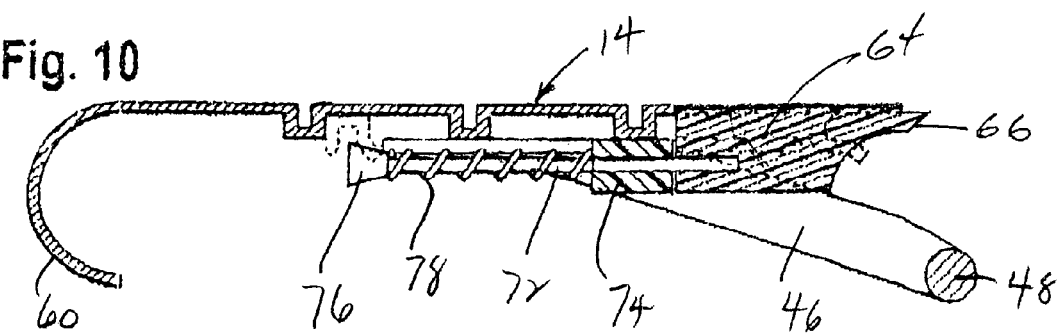

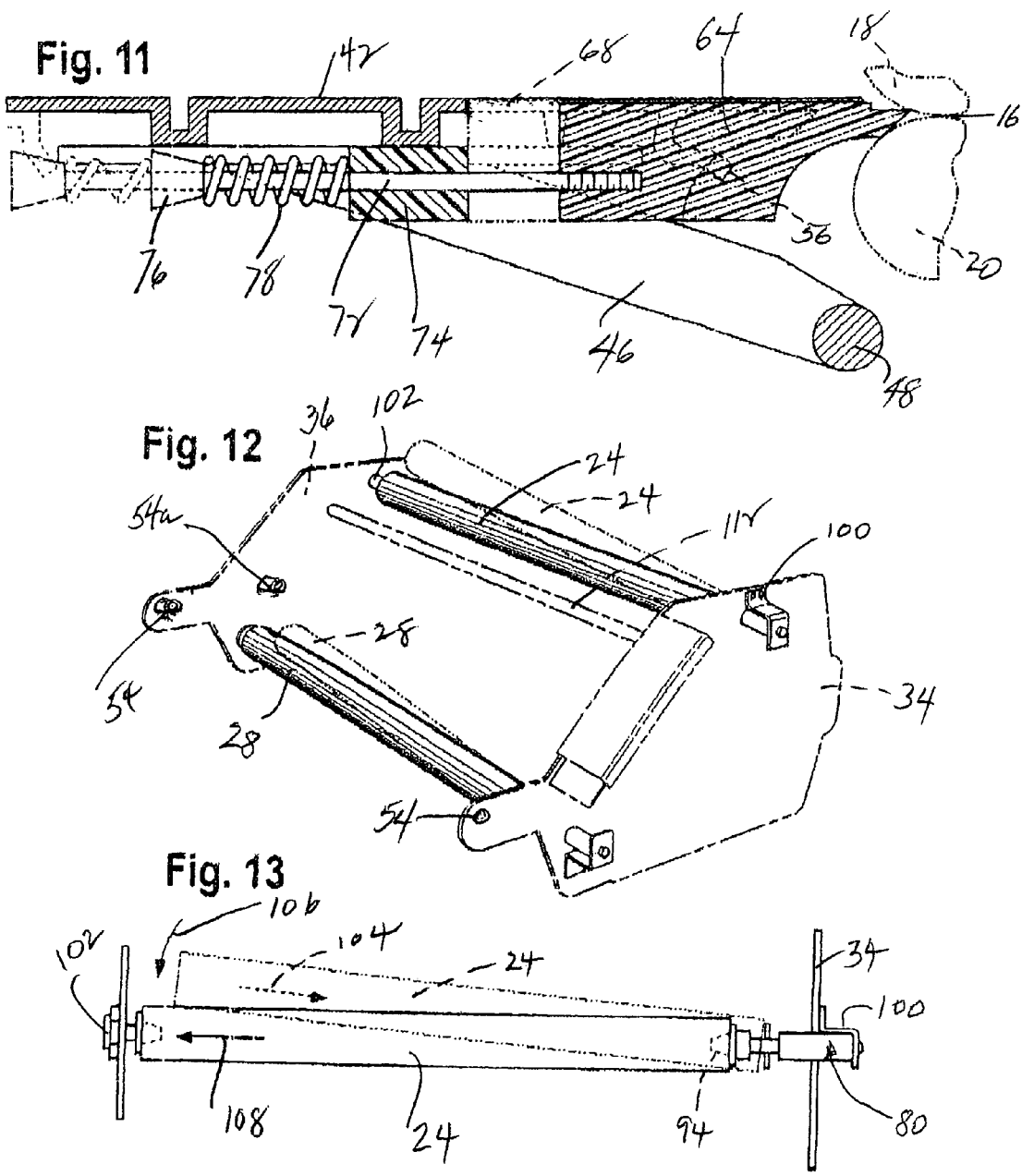

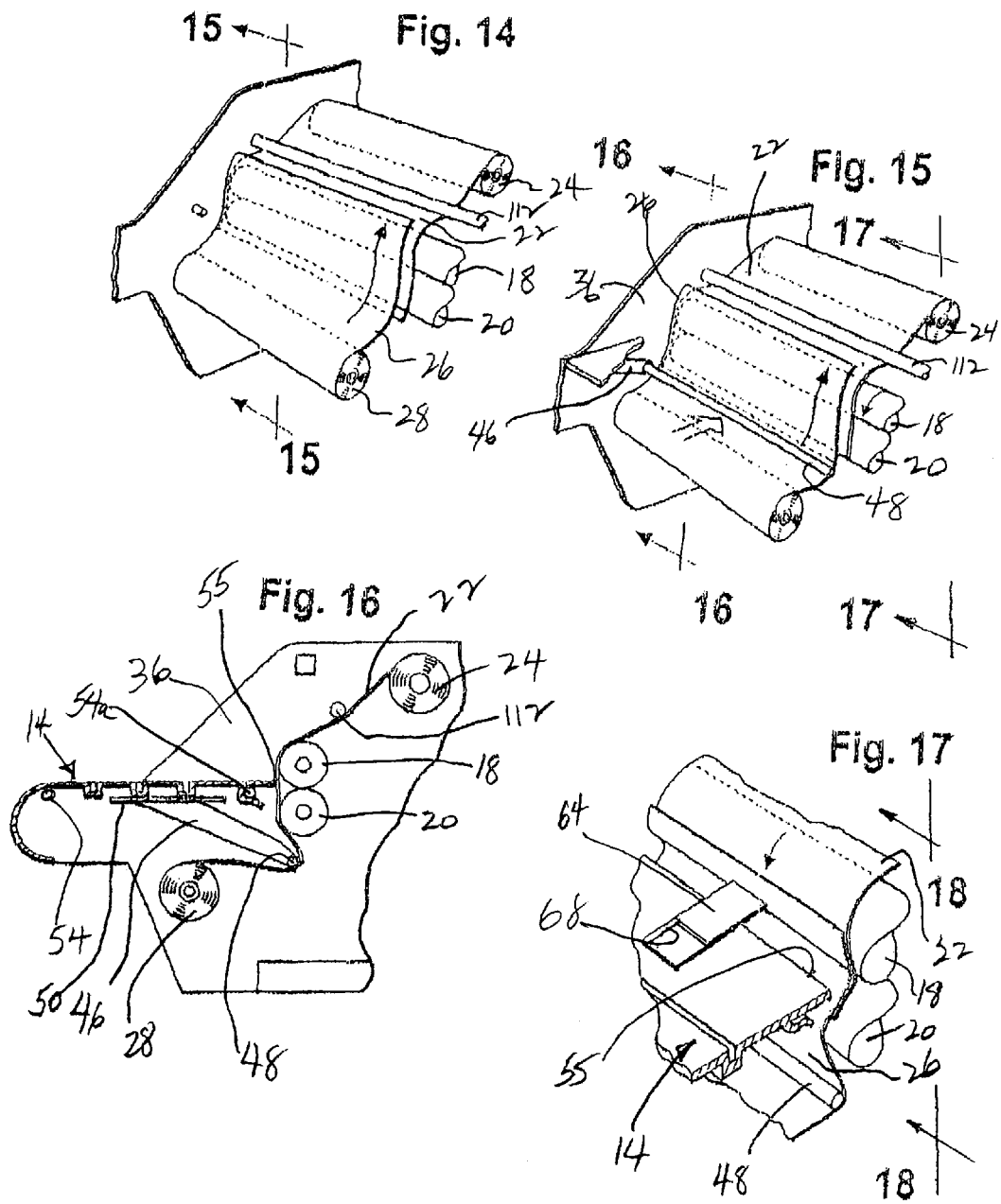

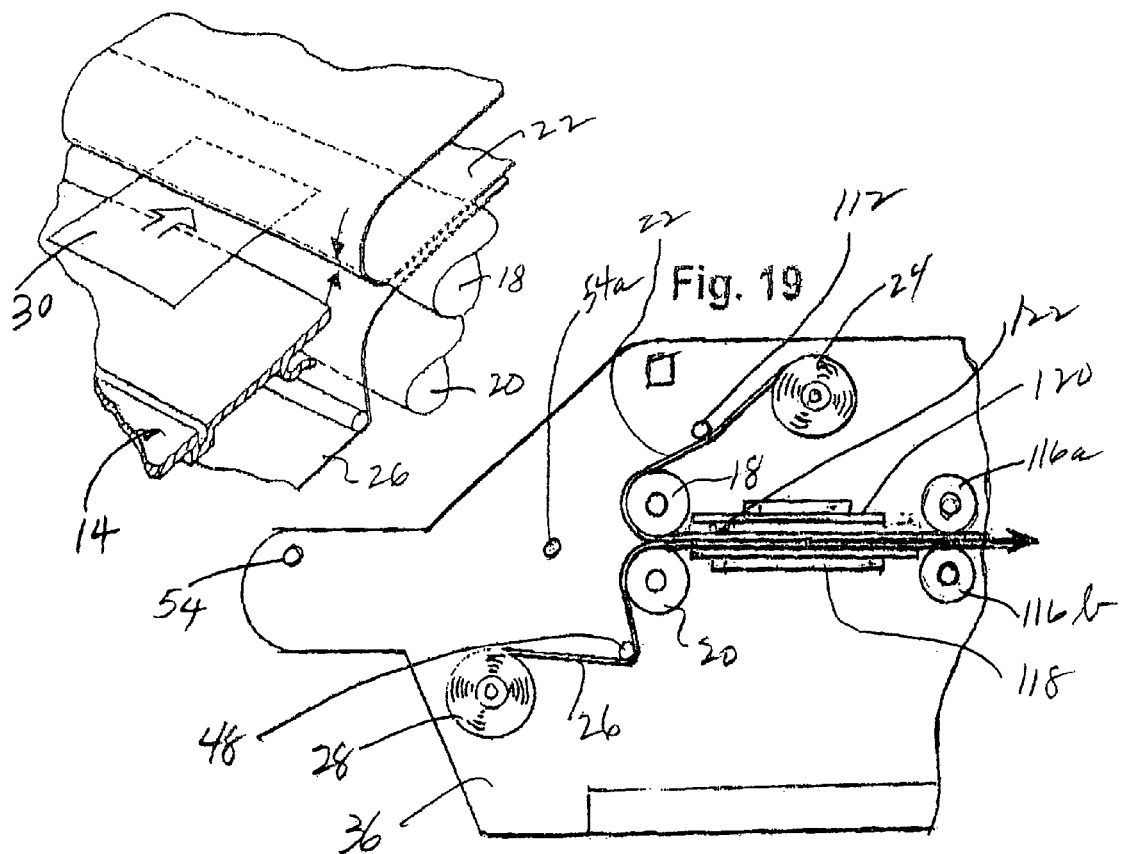
Fig. 18
Fig. 19
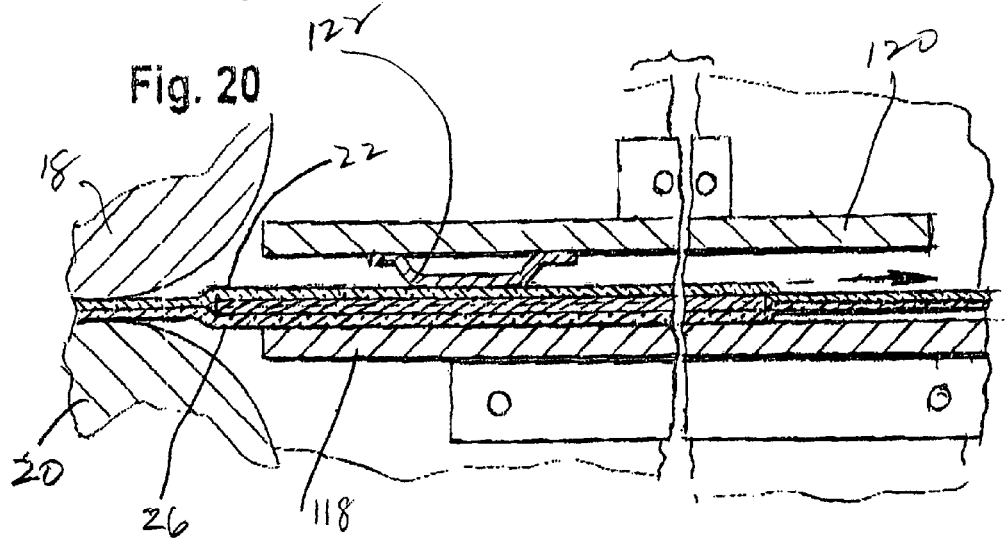
Fig. 20

LAMINATING MACHINE

This invention relates to improvements in machines for covering pages of copy material with film by encasing them between layers of the film. More particularly, it relates to initially introducing the upper and lower layers of film into a laminating machine easily and exactly in registration with each other, and without burning the installer's fingers on the heated film laminating rollers in the machine, and then pulling the film layers past the heated rollers without having the upper film bunch or buckle on top of the work piece being covered.

There are no patent applications related to this one. This application is not subject to any federally sponsored research or development or to any joint research agreement.

BACKGROUND OF THE INVENTION

Prior to the improvements described in this application a laminating machine known as "GBC Ultima 65 School Laminator" was promoted by General Binding Corporation in their 2001 Bulletin No. 1630371 3MO202, copyright 2001. The machine described in that bulletin utilized upper and lower supply rolls of laminating film, and the films from those supply rolls, with sheets of paper to be covered placed between the upper and lower films, were passed through the nip between upper and lower heated laminating rollers. A large number of the machines described in that brochure have presumably been in use in schools and offices which require sheet laminating equipment.

However, threading the films from the supply rollers through the machine and into operation on the heated laminating rollers has proven to be difficult for many classroom instructors, especially in aligning the webs of film with each other as they are inserted into the machine and thereafter placing them on the heated laminating rollers without having the installer's fingers touch the hot rollers.

In connection with observing these and related problems in the GBC Ultima 65 Laminator, and their solutions, other laminators and film handlers were investigated. The following United States patents were reviewed: U.S. Pat. Nos. 4,998,117; 6,352,188; 6,698,487; 6,423,169; 5,019,203; 5,071,504; 5,139,600; and 5,087,318. The lack of recognition of the problems addressed by the present invention is evident in all of the equipment disclosed in these patents.

SUMMARY OF THE INVENTION

The present invention is embodied in a laminating machine which has upper and lower laminating rollers with outer surfaces rotatably moving toward each other at a nip between them. There are upper and lower laminating film supply rollers from which webs of film extend onto the laminating rollers. First and second frame members support the laminating rollers and the laminating film supply rollers. A tray extends between the first and second frame members adjacent the nip between the laminating rollers, and a film insertion member is disposed on the tray in a manner to be able to move it far enough to press the films into the nip and then be retracted. The tray may be lifted off the machine while the supply rollers are being installed. It has a depending bracket on which an idler bar or roller is mounted, replacing an idler roller permanently mounted to the frame, so that the tray's roller may be brought into engagement with the film from the lower laminating film supply roller when that film is in place on the laminating rollers and the tray is set back on the machine.

Each of the laminating film supply rollers may have a socket formed in one end so that a spring-loaded chuck, affixed on one of the frame members, may be engaged in the socket when the supply roller is installed in order to position and support the supply roller on the frame.

Downstream from the laminating rollers draw rollers pull the laminating films from the laminating rollers, and an exiting film deflector overlies the upper laminating film to flatten the film if necessary and avoid any film bunches or buckles.

From the foregoing, and from the detailed description which follows, it will be apparent that the laminating machine described herein allows a classroom instructor or secretarial person to quickly and successfully replace supply rolls of laminating film.

It is one object of this invention to provide a laminating machine in which installing films from the upper and lower laminating film supply rollers on the machine's heated laminating rollers is accomplished precisely and rapidly without bringing the installer's fingers close to the heated rollers as the films are inserted between them.

It is a further object of this invention to provide a laminating machine in which the installation of the film from the lower laminating film supply roller is accomplished without having to thread the film past an idler roller in an obscure location.

It is a further object of this invention to provide a laminating machine in which the installation of the upper and lower laminating film supply rollers may be accomplished in exact registry with each other by relatively unskilled personnel.

It is a further object of this invention to provide a laminating machine in which the upper laminating film is protected against bunching or buckling on the sheet of material being enclosed downstream from the laminating rollers.

Other objects and features of this invention will be apparent to those persons who are skilled in the practical art of designing and using machines for enclosing sheets of materials such as paper between laminating films, particularly after reviewing the following description of the preferred embodiments of the present invention and the accompanying drawings.

BRIEF DESCRIPTION OF THE DRAWINGS

FIG. 4 is an enlarged perspective view of one of the chuck assemblies shown in FIG. 3;

FIG. 5 is a sectional view of the chuck assembly shown in FIG. 4 taken in the direction of the arrows 5-5 in FIG. 4 and illustrating a second position of a portion of the chuck assembly in dotted lines;

FIG. 6 is an elevational view of the chuck assembly shown in FIGS. 4 and 5 taken in the direction of the arrows 6-6 in FIG. 4;

FIG. 7 is a sectional view of the chuck assembly shown in FIGS. 4 and 5 taken in the direction of the arrows 7-7 in FIG. 4;

FIG. 8 is an enlarged exploded view, in perspective, of the tray supporting the copy material for entry into the improved laminating machine shown in FIG. 1 taken in the direction of arrows 8-8 in FIG. 2;

FIG. 9 is a sectional view of the tray in FIG. 8 taken in the direction of arrows 9-9 in FIG. 8;

FIG. 10 is another sectional view of the tray shown in FIG. 8 taken in the direction of arrows 10-10 in FIG. 8;

FIG. 11 is another sectional view of the tray shown in FIG. 10 taken in the direction of arrows 11-11 in FIG. 8 and illustrating movement of an element of the tray from a dotted line position to a second position shown in solid lines;

FIG. 12 is a perspective view of a portion of the improved laminating machine shown in FIG. 2 illustrating movement of the upper and lower laminating film supply rollers from dotted line initial installation positions to solid line installed positions;

FIG. 13 is an elevational view of the lower laminating film supply roller shown in FIG. 12 during the installation movement shown in FIG. 12;

FIG. 14 is a perspective view partially broken away of the laminating film supply rollers shown in FIGS. 12 and 13, and of the leading ends of the laminating films unrolled therefrom, during installation of the films on the laminating rollers of the laminating machine;

FIG. 15 is a perspective view partially broken away of the laminating film supply rollers, laminating rollers and leading ends of the films shown in FIG. 14 taken in the direction of arrows 15-15 in FIG. 14 and advanced from the positions shown in FIG. 14;

FIG. 16 is a sectional view partially broken away, taken in the direction of arrows 16-16 in FIG. 15, of the laminating film supply rollers, laminating rollers and leading ends of the films shown in FIG. 15 and advanced from the positions shown in FIG. 15;

FIG. 17 is an enlarged perspective view of a portion of the laminating rollers and leading ends of the films shown in FIG. 16 advanced from the positions shown in FIG. 16 and taken in the direction of arrows 17-17 in FIG. 15;

FIG. 18 is an enlarged perspective view of a portion of the laminating rollers and films shown in FIG. 17, advanced from the positions shown in FIG. 17 and taken in the direction of arrows 18-18 in FIG. 17, and also illustrating a piece of copy material being enclosed in the upper and lower laminating films;

FIG. 19 is a sectional view partially broken away of the laminating rollers, films and copy material shown in FIG. 18 advanced from the positions shown in FIG. 18 in the improved laminating machine in FIGS. 1 and 2; and FIG. 20 is an enlarged sectional view of a portion of the improved laminating machine enclosing the copy material as illustrated in FIG. 19.

DETAILED DESCRIPTION OF THE INVENTION

Figure 1:
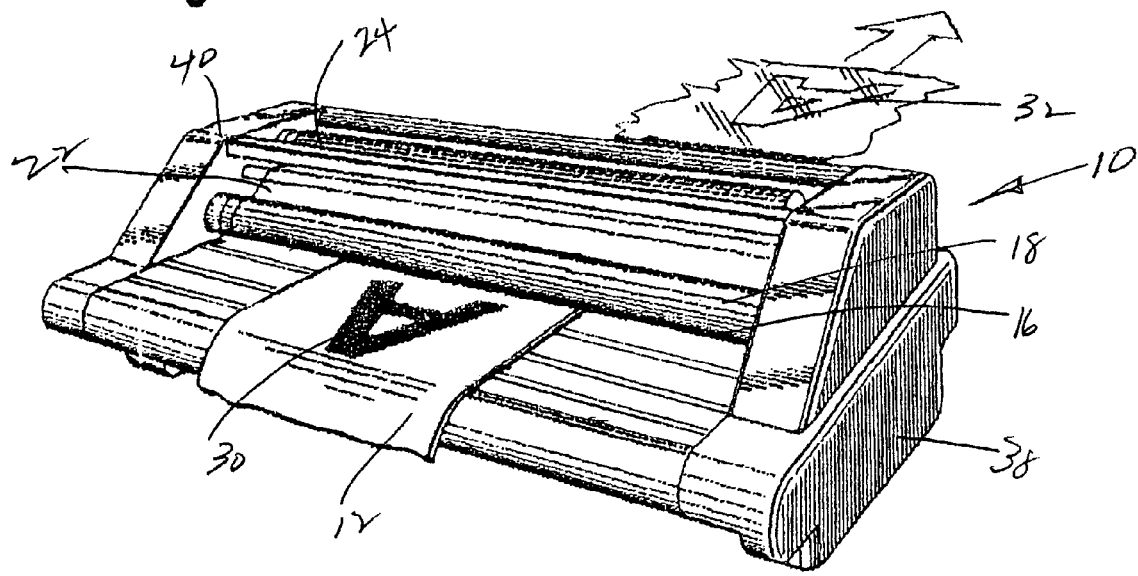
FIG. 1 is a perspective view of the improved laminating machine of this invention illustrating the entry of a sheet of copy material into the laminating machine between upper and lower laminating films.

The improved laminating machine 10 of this invention is shown in perspective in FIG. 1 accepting a sheet of copy material 12 to be enclosed in laminating film by the machine. The sheet 12 has been laid on a tray 14 and advanced into a nip point 16 between an upper laminating roller 18 and a lower laminating roller 20. Laminating film from an upper laminating film supply roller 24 extends around the upper laminating roller 18 above the sheet 12, and laminating film 26 from a lower laminating film supply roller 28 extends around the lower laminating roller 20 beneath sheet 12. The laminating rollers 18 and 20 are heated electrically to about 240 degrees Fahrenheit so that they are sufficiently hot enough to soften the laminating films 22 and 26 and cause those films to adhere to sheet 12. The films 22 and 26 are also clear enough to see the artwork 30 on sheet 12 through the films after they enclose it. Another sheet 32 of copy material which the machine 10 has previously enclosed in laminating film is shown exiting from machine 10.

In order for machine 10 to run smoothly, the upper and lower film supply rollers 24 and 28 must be initially installed in registry with each other so that the films 22 and 26 which are wrapped around them unroll in constant registry with each other as they are laid on sheets of copy material, such as sheet 12, and proceed on through machine 10. Also, the step of installing the supply rollers must be capable of being done with means which a classroom instructor of a secretary can operate without having to call an assistant. And after the supply rollers are installed in the laminator, threading the films on them into the heated laminating rollers must be accomplished quickly and mechanically but without requiring an installer to bring his hands close to or touch the heated rollers. Finally, downstream from those rollers, the films need to be drawn smoothly beyond the rollers without bunching so that the machine can issue a superior laminated product.

Figure 2:
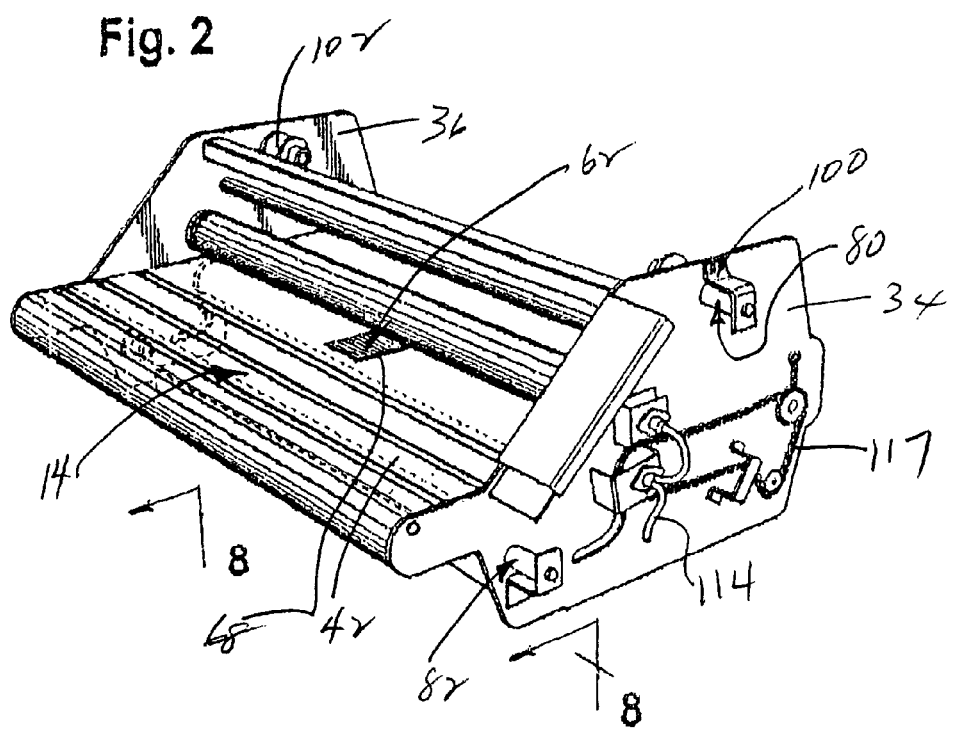
FIG. 2 is another perspective view of the laminating machine in FIG. 1 substantially assembled but without the machine covers and the upper and lower laminating films.

As shown in FIGS. 1 and 2, first and second frame members 34 and 36 of laminating machine 10 are enclosed in covers 38 and 40, respectively. When the covers 38 and 40 are removed, as in FIGS. 2 and 3, for example, the internal arrangement of machine 10 is more easily viewed. The tray 14 on which copy material such as sheet 12 is placed in preparation for inserting the sheet into the machine, includes a deck 42 having an upper surface leading to the nip point 16 between laminating rollers 18 and 20. A bracket 44 depends from the underside of tray 14, extending downwardly and forwardly in the downstream direction traveled by the films. The bracket 44 includes a pair of arms 46 which hold an idler roller 48 in position against laminating film 26 as that film moves from the lower laminating film supply roller 28 onto the lower laminating roller 20.

The bracket arms 46 may be fastened to the underside of tray 14 by welding or by an alternative means such as the metal strips 50 formed on the arms which may be bolted to the deck 42. Idler roller 48 below the deck 42 is engaged between the bracket arms with pins 52 mounted in the arms. Other means besides the pins 52 may be used, so long as the idler roller 48 is freely rotatable against laminating film 26 as it unwinds from the lower laminating film supply roller 28.

Tray 14 may be lifted away from the rest of the laminating machine 10 very easily because it is only engaged on studs 54 and 54*a* which are attached to the first and second frame members 34 and 36. Note FIG. 16, for example. The studs are arranged across from each other on the first and second frame members and extend inwardly toward each other from those frame members. Tray 14 has a lip 56 adjacent the downstream end 55 of the tray depending from the underside of the tray and forming a yoke 58 with the tray. The lip 56 engages studs 54*a* on the first and second frame members, thus arresting downstream end 55 in the yoke. The upstream end 60 of the tray rests upon studs 54 which also extend inwardly toward each other from the first and second frame members. When it is desired to lift the tray 14 from laminating machine 10, the upstream end 60 of the tray is raised slightly and moved in the upstream direction away from the first and second frame members and off of the studs.

When tray 14 is lifted away from the rest of laminating machine 10, as just described, the idler roller 48 is separated from its engagement on the film 26 between the lower laminating film supply roller 28 and the heated lower laminating roller 20. As will be more fully described below, lifting the tray 14 from the machine permits easy access to the location of the lower laminating film supply roller. When the film on that roller has been used up, or a different film is desired, the roller itself can be removed and a new one with a fresh supply of film can be installed easily because it will not be necessary to pass the lead end of the new film past a lower idler roller which is fastened to the frames.

A film insertion member 62 is also supported on tray 14. Its purpose is to press the film from the upper and lower film supply rollers 24 and 28 into the nip 16 between the upper and lower heated laminating rollers 18 and 20. The insertion member 62 is located along the downstream end 55 of tray 14 adjacent to nip 16. Preferably the insertion member and the upper surface of tray 14 form a planar surface leading to the nip so that a sheet of copy material such as sheet 12 can be moved across the upper surface of tray 14 smoothly and without obstruction. If the insertion member were a wiper or other form of sliding mechanism resting or sliding along the upper surface of the tray (not shown) instead of the form of insertion member shown, the smooth planar surface of the tray achieved by the insertion member facilitates advancing sheet 12 smoothly into nip 16.

The form of film insertion member 62 illustrated here is a plunger 64 having a relatively thin bar-shaped front edge 66 which will fit closely into nip 16 when the plunger is moved toward the nip. The plunger fits into a slot or channel 68 in the downstream end 55 of tray 14. It can be moved far enough forwardly from there, that is, in a downstream direction, to press one or more film layers into nip 16. The plunger 64 may also be moved backwards in channel 68 so as to draw it out of engagement with any film passing the downstream end 55 of tray 14.

A carriage member such as the carriage 70 may be affixed to the underside of tray 14 to carry plunger 64 while it slides forward and backward in channel 68. The carriage 70 may be formed to support the plunger on slides or in a track or similar mechanism permitting it to be moved and protrude beyond tray end 55 and press film into nip 16.

To automatically pull the plunger 64 completely back into channel 68 after using it to insert film into nip 16, a push rod 72 is affixed to the rear of the plunger, as shown particularly at FIGS. 8 and 10. Push rod 72 is also slidably engaged on the underside of tray 14 adjacent the upstream end of channel 68, held there by a block 74 having a bore through which the rod 72 can be moved back and forth easily. In operation, push rod 74 is used to push the plunger 64 along channel 68 in a downstream direction away from the block 74 or pull it in an upstream direction back against block 74. A stop 76, which also serves as a knob for operating push rod 72, may be mounted on the opposite end of the push rod from the plunger 64, and a coil spring 78 wrapped around push rod 72 intermediate and compressed between stop 76 and block 74. Accordingly, when the stop 76 and the push rod 72 are pressed in a downstream direction, i.e., toward plunger 64, the stop 76 moves toward block 74 and compresses the spring 78 between the stop and the block. Pushing the rod in this direction moves the plunger along the channel and moves the front edge 66 of the plunger beyond the tray 14 toward nip 16 between the heated laminating rollers. However, when pressure on the push rod in the downstream direction is released, spring 78 expands, pushing the stop 76 away from block 74 and pulling the plunger 64 back against the block so that the plunger once again is positioned wholly within the channel 68 in tray 14.

Upper and lower laminating film supply rollers 24 and 28 can be easily changed when the supply of film which each one carries is exhausted or needs to be changed for some reason. Normally the supply rollers are throw-away items and may be made of hollow cardboard tubes or similar disposable material. The old rollers must be removed from the laminating machine and replacements wound with another supply of film must be installed. Proper positioning of the new supply rollers inside the frame members is essential for achieving smooth unrolling of the film during the lamination process. Such reloading should also be capable of being accomplished in a short period of time by a minimally trained person whose attention is more focused on persons using the machine than on how to run it.

Figure 3:
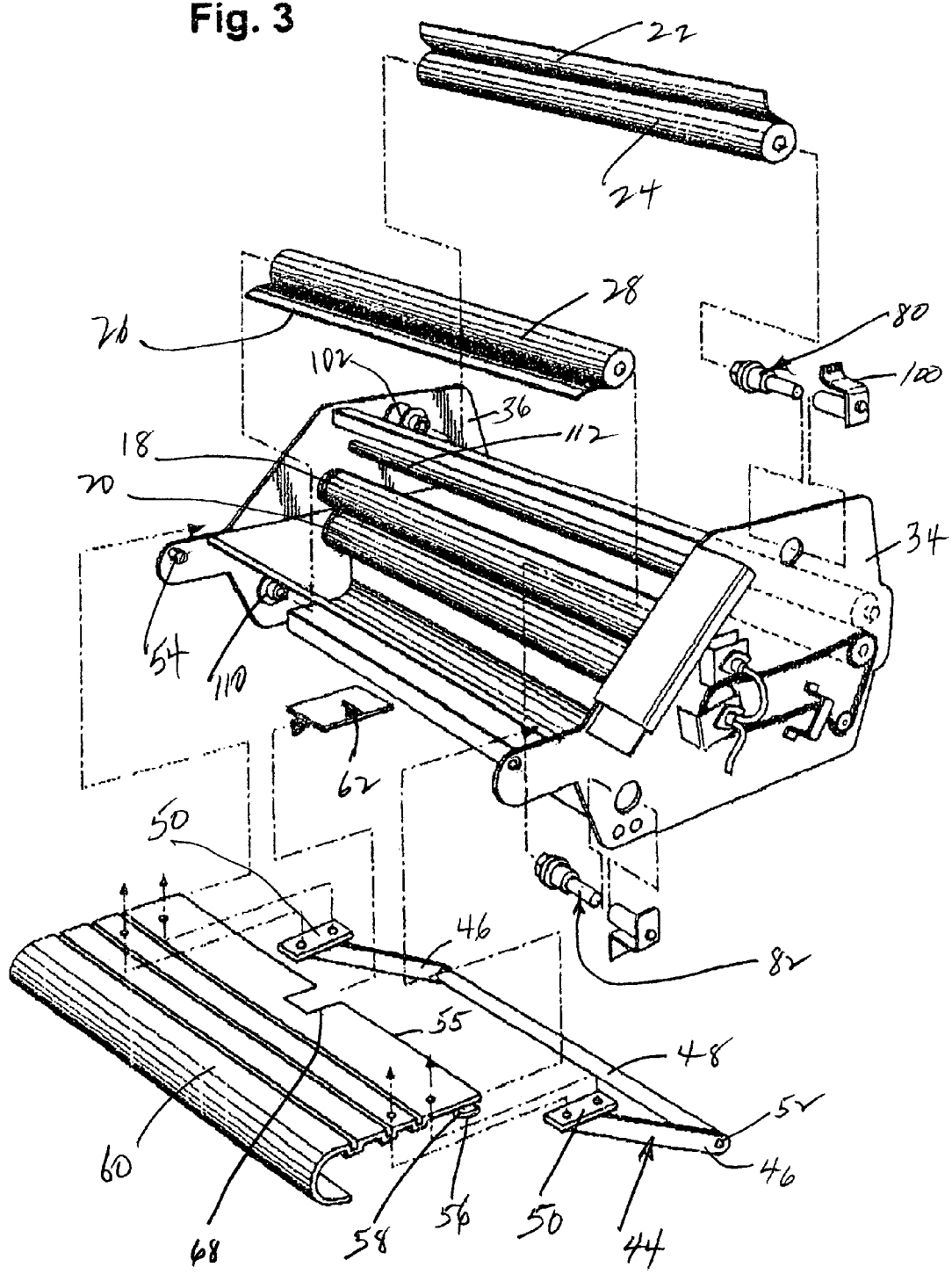
FIG. 3 is an exploded view of the laminating machine shown in FIG. 2.

In the laminating machine of this invention, the laminating film supply rollers 24 and 28 are held in place between the first and second frame members 34 and 36 by variable length spring-loaded chucks at one end and fixed length chucks at the other end. In FIG. 3 the variable length chucks are shown at 80 for the upper laminating film supply roller 24 and at 82 for the lower laminating film supply roller 28. Variable length chuck 80 is shown in enlarged perspective in FIG. 4, and since variable length chuck 82 is identical except for the bracket holding it onto the first frame member 34, chuck 80 may be taken as typical.

Chuck 80 includes a stem member 84 which is slidably disposed in a cylindrical body 86. An abutment 88 is located in one end of the cylindrical body 86, and a pin 90 extends through the abutment to engage the stem 84. Inside the cylindrical body 86, a coil spring 92 surrounds the pin 90 and at one end engages the abutment 88. Opposite that engagement on abutment 88, the coil spring's other end may be affixed to pin 90, or it may extend far enough to engage stem 84. Pin 90 extends slidably through the abutment 88 so that when the stem 84 is moved inside the cylindrical body 86 toward the abutment 88 stem 84 will compress the spring 92 against the abutment 88. A portion of pin 90 inside the spring 92 will be forced on through the abutment 88 and move beyond the abutment. When pressure on the stem 84 is relaxed to the point that spring 92 can expand, stem 84 will be moved in a direction away from the abutment 88, and much of pin 90 will be brought back inside the cylindrical body 86.

At the other end of stem 84, outside of the cylindrical body 88, a chuck head portion 94 is formed which fits into an open end of a tubular core, or a similar engagement dock, forming a socket portion 96 in the end of the upper laminating film supply roller 24. Head 94 may be provided with lugs 98 for improved engagement in socket 96, and both the head and the lugs may be shaped into the form of a tapered cone as illustrated in cross section in FIG. 5. Together, the stem 84 and the head 94 form a piston which moves back and forth in the cylindrical body 86 of chuck 80 against the coil spring 92 and positions the chuck head portion 94 firmly in the socket portion 96 of supply roller 24.

The spring-loaded chuck 80 is mounted on first frame member 34, as shown particularly in FIGS. 2 and 12. Chuck 80 may be held in place there by bracket 100. A fixed-length chuck 102 is mounted in second frame member 36 opposite the location of chuck 80 and is engageable in a second socket portion at the other end of the upper laminating film supply roller 24 which is similar to socket portion 96. When it is necessary to change the upper laminating film supply roller from an old one to a new one, an operator pushes the roller to be removed axially against the variable-length chuck 80 until the end of the supply roller engaged on the fixed-length chuck 102 is freed from that chuck and can be lifted from it. Thereafter, the end of the old supply roller engaged on chuck 80 may be freed from chuck 80 and that roller removed from the laminating machine so that it may either be thrown away if it is spent, or stored for later use if it still carries film to be saved.

Placing a fresh upper laminating film supply roller in use after its predecessor has been removed is illustrated in FIGS. 12 and 13. The installation steps are quite similar to the removal steps just described. Socket portion 96 at one end of the fresh roller is engaged on head portion 94 of variable-length chuck 80. The roller is then pushed axially in the direction of arrow 104 toward the first frame member 34, thereby pushing the head portion 94 of the chuck 80 toward the cylindrical body portion 86. The opposite end of the fresh roller is then lowered in the direction of arrow 106 in FIG. 13 so that a socket portion in that end of the fresh roller is positioned to engage the fixed-length chuck 102. Thereafter, as pressure on the fresh roller is released, the coil spring 92 inside the variable-length 80 urges the fresh roller in the direction of arrow 108 to engage the roller onto chuck 102. Both chucks, 80 and 102, rotate in their mountings, so that when the fresh roll of film is installed, the upper laminating film roller's supply of film can be pulled and unrolled from that roller whenever it is needed.

Installation and threading of the fresh laminating film from the supply rollers 24 and 28 is illustrated in FIGS. 14 through 17. With tray 14 temporarily lifted out of the laminating machine 10, and the upper and lower laminating film supply rollers 24 and 28 installed on variable-length chucks 80 and 82 and fixed-length chucks 102 and 110, respectively, in the manner just described, the leading end of laminating film 22 from the upper laminating film supply roller 24 is led below an upper idler bar 112 and laid smoothly over both heated laminating rollers 18 and 20. A similar leading end of laminating film 26, long enough to cover both lower and upper heated laminating rollers 18 and 20, is peeled away from the lower laminated film supply roller 28 and laid smoothly over the leading end of laminating film 22. Tray 14 is then put back in place, pushing idler roller 48 into laminating film 26 from the lower laminating film supply roller 28 and engaging the outer edges of tray 14 on studs 54 and 54a. The downstream end 55 of tray 14 is moved very close to, and may even temporarily touch, the initial lengths of film as illustrated in FIG. 16. Film insertion member 62 is then operated, as above described, to press the front edge 66 of plunger 64 into the overlapping laminating film ends and urge them into nip 16 between the upper and lower heated laminating rollers 18 and 20.

When the laminated films 22 and 26 are through the nip 16 and moving downstream, a sheet of copy material such as sheet 12 may be fed across table 14 and between the films as illustrated in FIG. 18.

The heated laminating rollers 18 and 20 are raised to laminating temperature from electrical cables 114, and are driven by an electrical motor (not shown). Downstream from rollers 18 and 20 there is a set of draw rollers 116a and 116b which is coordinated by way of a drive chain 117 with the laminating rollers 18 and 20. Together they move the upper and lower laminating films 22 and 26, with a sheet 12 between them, smoothly through laminating machine 10. A lower film supporting tray 118 is arranged beneath laminating film 26 as it exits from the heated laminating rollers to maintain the films and their enclosed sheet 12 in a level plane between the heated laminating rollers and the draw rollers. Having an interval between these sets of rollers is desirable in order to allow the upper and lower films to adhere to each other well as they cool, and also to adhere to sheet 12, following their exit from the heated laminating rollers.

In order to prevent the upper laminating film from following the surface of the upper laminating roller on the exit side of the heated rollers, an upper tray 120 is provided, closely overlying the layers of film and enclosed laminated sheets as they exit from the laminating rollers and pass over the supporting tray 118. The upper tray 120 acts as a deflector for the layers and assures that they do not follow the upward movement of roller 18 on the downstream side of nip 16. A ridge element 122 may be added to the underside of the upper tray 120 to urge the laminated layers toward the supporting tray 118, as illustrated in FIGS. 19 and 20.

From all of the foregoing it will be evident that, although particular forms of the invention have been illustrated and described, nevertheless various modifications can be made without departing from the true sprit and scope of the invention. Accordingly, no limitation is intended by the foregoing description, and its full breadth is intended to be covered by the following claims.

I claim:

1. A laminating machine comprising
    upper and lower laminating rollers having first and second ends and outer surfaces rotatably moving toward each other adjacent a nip between them,
    upper and lower laminating film supply rollers having first and second ends and outer surfaces substantially parallel to the laminating rollers,
    frame members opposite each other at the ends of the upper and lower laminating rollers and the upper and lower laminating film supply rollers,
    socket portions in the ends of the laminating film supply rollers, and
    a variable-length spring-loaded chuck member having a forward end arranged to engage a supply roller socket portion mounted on a frame member and including
    a chuck head portion at the forward end of the chuck member, and
    a spring portion compressed between the head portion and an abutment in the chuck member permitting movement of the head portion at the forward end of the chuck member back and forth against the spring portion and urging the head portion into engagement with the socket portion,
    said spring-loaded chuck member also supporting the end of the laminating film supply roller on the head portion or releasing that end of the supply roller from the frame member.

2. The laminating machine of claim 1 in which the chuck member comprises a cylindrical body and a piston slidably mounted in the cylinder.

3. The laminating machine of claim 2 in which a spring is located inside the cylindrical body intermediate the cylindrical body and the piston.

4. The laminating machine of claim 2 in which the piston is rotatably mounted inside the cylindrical body for rotational movement inside the cylindrical body along with the laminating film supply roller.

5. The laminating machine of claim 1 in which the socket at the other end of the laminating film supply roller is engaged on a stud connected to the opposite frame member.

6. The laminating machine of claim 5 in which the stud is a fixed length.

* * * * *